United States Patent [19]

Schornick et al.

[11] Patent Number: 4,835,232

[45] Date of Patent: May 30, 1989

[54] HEAT-CURABLE MOLDING COMPOSITIONS

[75] Inventors: Gunnar Schornick, Neuleiningen; Philipp Eisenbarth, Bad Durkheim; Rudolf Schuhmacher, Boehl-Iggelheim, all of Fed. Rep. of Germany; Jack D. Boyd, San Clemente, Calif.

[73] Assignee: BASF Aktiengesellschaft, Ludwigshafen, Fed. Rep. of Germany

[21] Appl. No.: 147,248

[22] Filed: Jan. 22, 1988

[30] Foreign Application Priority Data

Jan. 23, 1987 [DE] Fed. Rep. of Germany ....... 3701900

[51] Int. Cl.$^4$ ............................................. C08F 26/06
[52] U.S. Cl. ..................................... 526/262; 526/282
[58] Field of Search ................................ 526/262, 282

*Primary Examiner*—Paul R. Michl
*Assistant Examiner*—Alex H. Walker
*Attorney, Agent, or Firm*—William G. Conger

[57] ABSTRACT

Bismaleimide resin systems containing one or more bismaleimides and an alkenyl and/or alkynyl substituted phenylated dicyclopentadiene comonomer have high glass transition temperatures and impact resistance.

9 Claims, No Drawings

HEAT-CURABLE MOLDING COMPOSITIONS

BACKGROUND OF THE INVENTION

1. Field of the Invention

The invention relates to heat-curable molding compositions based on bismaleimide resins. More particularly, the invention relates to improved bismaleimide resin compositions having improved toughness without sacrificing thermal stability.

2. Background of the Invention

Bismaleimide resins, which also contain aromatic diamines as comonomers as disclosed in Federal Republic of Germany Pat. No. 1,770,867 demonstrate excellent mechanical and electrical properties after thermal curing at temperatures in excess of 200°C. However, the monomers have limited solubility in ordinary solvents and the cured products are very brittle. Maleimide resins containing polyphenols as comonomers according to Federal Republic of Germany published application No. 2,459,925 demonstrate insufficient toughness.

An improvement in toughness may be achieved by using binuclear allylphenols or allylphenol ethers, as described, for example, in U.S. Pat. No. 4,100,140. However, these comonomers show a relatively low fusion viscosity creating difficulties when impregnating reinforcing fibers as is commonly done in the preparation of fiber-reinforced prepregs. As a result of the relatively large proportion of aliphatic structural elements, these resins do not possess sufficient thermal-oxidative stability for certain applications.

SUMMARY OF THE INVENTION

The object of the invention is to make available bismaleimide resins which do not demonstrate the aforesaid disadvantages. This and other objectives are met by the resins of this invention, which contain polycyclic comonomers based on dicyclopentadiene (DCPD). These resins possess good solubility, a favorable fusion viscosity and, in turn, good impregnating ability. Cured molding compositions exhibit good resistance to heat, favorable toughness and low water absorption.

It is necessary that the comonomers used according to the process of this invention are polycyclic compounds and/or mixtures of compounds which contain phenylated dicyclopentadiene structures possessing at least two alkenyl and/or alkynyl groups R, preferably allyl($CH_2$=CH—$CH_2$—), propenyl($CH_3$CH=$CH_2$—), or propargyl (HC≡C—$CH_2$—) groups attached directly or through ether linkages to the aromatic rings.

Starting materials for preparing the alkenyl and/or alkynyl arenes are polyphenols having the formula:

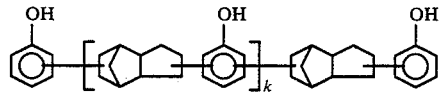

These polyphenols are prepared by the reaction of cyclopentadiene, for example, with monophenols such as, o-cresol, p-cresol or with other monophenols as described in U.S. Pat. No. 3,419,624. In so doing, oligomeric mixtures are obtained so that k is, on the average, greater than 0. One can adjust the molecular weight by the ratio of dicyclopentadiene to the phenol component. Preferably, k lies between 0.1 and 3.0.

The alkenyl and/or alkynyl arenes are prepared by the reaction of the polyphenols, just described, with alkyl or alkynyl halides according to the process described in Federal Republic of Germany published application No. 28 18 091. Preferred once again, are allyl chloride, allyl bromide, methallyl chloride, and propargyl chloride.

One first obtains the corresponding O-alkenyl and/or alkynyl ethers ($R^1$=H, R=alkenyl or alkynyl). The O-alkenyl ethers are able to be converted by Claisen-rearrangement by the process disclosed in Federal Republic of Germany Published Application No. 28 18 091, into the corresponding alkenyl phenols ($R^1$=alkenyl, and R=H). When using alkynyl halides, e.g. propargyl chloride, mixtures of alkynyl ethers and alkynyl phenols are formed during the etherification step. The 2-alkenylarenes are further able to be converted into 1-alkenyl-arenes according to the process described in European published application EP-A No. 14,816.

The bismaleimide resins useful in the practice of the subject invention are obtained by the reaction of the DCPD derived alkenyl and/or alkynyl arenes with a bismaleimide having the general formula:

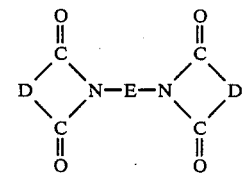

in which D is an optionally substituted hydrocarbon double bond and E is a doubly valent radical having at least two carbon atoms. Such bismaleimides are disclosed, for example from Federal Republic of Germany published applications Nos. 2,040,094, 2,719,903 and 3,247,058. In addition to bismaleimides, also suitable are polymaleimides as well as mixtures of different bismaleimides. Preferred bismaleimides are: 4,4'-bismaleimidodiphenylmethane, 4,4'-bismaleimidodiphenylether, 3,3'-bismaleimidodiphenylsulfone, 2,4'-bismaleimidotoluene, 1,6-bismaleimidohexane and 2,4,4-trimethyl-1,6-bismaleimidohexane. They may also be contain up to 20 weight percent of a monoimide.

One can adjust the stoichiometry of the reaction of the bismaleimide with the alkenyl and/or alkynyl dicyclopentadiene derived arenes over a wide range. An equivalent ratio of from 1 to 0.05-5 is preferred. One assumes that along with the presumably radically initiated copolymerization, reactions of the addition type also occur, for example, Ene-reactions and Diels-Alder-reactions. Depending on the intended application, it can be advantageous to add additional components to the resin. Examples are ordinary epoxy resins or vinyl ester resins.

Other additives which can be used are amines, preferably aromatic diamines, for example 4,4'-diaminodiphenylmethane, and aminophenols. These additives are also able to enter into an addition reaction with the maleimide double bonds. Prepolymers can also be employed, for example those derived from a bisimide and an amine.

For certain applications, it may be effective to employ vinyl monomers for adjusting the desired viscosity; typical of which are, for example, styrene, α-methylstyrene, divinylbenzene, acrylic esters or methacrylic esters, diallylphthalate, 3,3'-diallylbisphenol A, triallylisocyanurate, triallylcyanurate or N-vinylpyrrolidone. These monomers may be present in amounts up to about 50 weight percent, based on the weight of the total composition.

The resin compositions can also contain catalysts and even inhibitors as additional additives. Typical catalysts are tertiary amines, imidazoles, organic acids, and peroxides. Useful inhibitors include phenothiazine, various hydroquinones, and benzoquinone. The quantities of catalyst and inhibitor used should generally be between about 0.05 and 1.5 weight percent.

The resin compositions can also contain other additives common to the technology of curable plastics, like fillers, plasticizers, pigments, colorants, mold release agents, and flame retardants. Useful as fillers are, for example, glass fibers, carbon fibers, graphite powder, mica, quartz powder, kaolin and metal powders, up to a proportion of 80 weight percent based on the resin composition.

The resin compositions of the subject invention may be employed as impregnating resins, casting resins, laminating resins or filled or unfilled molding compositions. The resin systems are particularly useful as matrix resins in the manufacture of fiber reinforced prepregs, particularly those containing glass, carbon/graphite, and/or aramid fibers, and/or fibers containing arylene or polyarylene residues connected by ether, ketone, and sulfone linkages, as described, for example, in U.S. Pat. No. 4,175,175.

If they are to serve in the preparation of high performance composites, then the impregnation of unidirectional or woven glass fibers, carbon fibers, aramid, or other fibers may take place either in the melt at temperatures from about 50° to 150° C., or in solution. Typical solvents are halogenated hydrocarbons, for example, dichloromethane; ketones such as acetone or methethylketone; glycol esters; toluene; dimethylformamide; N-methylpyrrolidone; and mixtures of several solvents.

When preparing the bismaleimide resins, the starting materials are mixed together using ordinary techniques and heated to temperatures between 70° to 90° C., whereby the formation of a prepolymer may take place. Depending upon the degree of advancement of the prepolymerization process, and the nature of the various monomers, one may obtain a highly viscous melt or a glass-like solid which, depending on the application, may be ground, or dissolved in a solvent. The preparation of the resins can also occur in one of the aforesaid solvents.

The curing of the resins occurs at temperatures of from about 100° to 300° C., preferably between 160° to 260° C., optionally under pressure. The selected curing temperature is dependent upon the length of the curing time and vice versa. Frequently, step-wise curing is advantageous, whereby cross-linking the polymers is induced first while molding at lower temperatures. Following demolding, complete curing can be achieved by a post cure for several hours at a temperature above 200° C.

High performance composites, insulating material, structural components, equipment casings and electrical components which withstand high temperatures are able to be prepared from the resins.

EXAMPLE 1

(a) Preparing a Polyphenol from Dicyclopentadiene and Phenol (k=ca. 0.3)

A mixture of 940 grams of phenol and 250 grams of an acidic ion exchange resin, Lewatit® SPC-118, was melted at 70° C following which the heating bath was removed. Over a period of one hour, 132 grams of dicyclopentadiene was added dropwise while maintaining a temperature of 70° C.

After an additional 24 hours at 70° C., the ion exchange resin was removed by filtration and washed with molten phenol. The excess phenol was distilled off in vacuo leaving 236 grams of a red-brown polyphenol having a softening point of 66° C (Koflerbank) and a hydroxyl group content of 10.25 percent by weight.

(b) Allylation of the Polyphenol

A mixture of 217.6 grams of the polyphenol prepared according to (a), 55.8 grams of sodium hydroxide and 1000 ml of n-propanol were heated to about 90° C to which was added dropwise over a period of one hour, 135.2 grams of allylchloride.

The mixture was stirred an additional six hours while refluxing, and after cooling, the precipitated sodium chloride removed by filtration. After removing the solvent by distillation, 230 grams of the corresponding O-allylether remained as an oil having a viscosity of 40 mPas at 100° C.

(c) Claisen Rearrangement of the Allylether

After applying a vacuum of about 1 mbar, 230 grams of the allylether prepared according to (b) was heated for 3 hours at 210° C. Obtained was 228 grams of an o-allylphenol adduct of dicyclopentadiene, as a red-brown, highly viscous resin which slowly solidified at room temperature. Its softening point was about 20° C (Koflerbank), NMR ($D_6$-DMSO, 270 MHz): 0.85–2.95 m (DCPD-H), 3.20–3.50 (m, 4H, allyl-$CH_2$), 5.00 (s, OH, superimposed), 4.90–5.25 (m, 4H, olefinic H), 5.95–6.05 (m, 2H, olefinic H), 6.60–7.20 (m, aromatic H).

(d) Preparing a Bismaleimide Resin from the DCPD-Allylphenol Adduct 1c

To 300 grams of the o-allylphenol adduct prepared according to (c) and 3 grams of 2,6-dimethylhydroquinone in a stirred reaction vessel maintained at 160° C., was added 700 grams of 4,4'-bismaleimidodiphenylmethane. Following an additional 10 minutes of heating, the low viscosity resin mass was further processed as follows:

(1) A portion of the resin was poured out onto a metal plate in order to cool it down more quickly. Following cooling, the red-brown resin had a softening point of 50° C (Koflerbank); its gel time was 1 hour 17 minutes at 160° C.

(2) The remaining portion of the resin was poured into two metal molds, 1 mm and 4 mm deep, respectively, and then cured for 2 hours at 160° C., 5 hours at 190° C., and 8 hours at 240° C. The polymer had a glass transition temperature in excess of 300° C (according to DIN 53 455); at 345° C it still had 50 percent of its room temperature shear modulus (according to DIN 53 455), its modulus of elasticity was 3850 N/$mm^2$ (DIN 53 457); its impact resistance was 9.1 Kg/$m^2$ (DIN 53 453) and its water absorption following 24 hours of storage in boiling water was 3.72 percent.

EXAMPLE 2

Preparing A Bismaleimide Resin from DCPD-Allylether

In a manner analogous to Example (1d), a bismaleimide resin was prepared from 300 grams of the DCPD-allylether of Example (1b), 700 grams of 4,4'-bismaleimidodiphenylmethane and 3 grams of 2,6-dimethylhydroquinone and cured. The glass transition temperature of the polymer was above 300° C., the 50 percent value of the room temperature shear modulus was 330° C and its modulus of elasticity was 3790 N/mm².

EXAMPLE 3

(a) Allylation of a Polyphenol from Cresol and Dicyclopentadiene (k=0.5)

A mixture of 360 grams of a polyphenol prepared in a manner analogous to that of Example 1a from cresol and dicyclopentadiene and 82 grams of sodium hydroxide in 1000 ml of n-propanol were reacted with 196 ml of allylchloride in a manner analogous to Example 1b. Obtained was 350 grams (80%) of O-allylether.

(b) Claisen Rearrangement of the Allylether 350 grams of the DCPD-Cresol allylether from Example 3a was converted as in to Example 1c, into the corresponding allylcresol. Yield: 348 grams (79%). $^1$H-NMR (270 MHz, D$_6$-DMSO): 0.8–2.35 (m), 2.15 (s, CH$_3$), 2.70–3.0 (m), 3.30 (d, CH$_2$-Allyl), 4.90–5.10 (m, CH$_2$-olefinic), 5.80–6.0 (m, CH-olefinic), 6.60–6.90 (m), ca. 7.80 (OH).

(c) Preparing a Bismaleimide Resin from the DCPD-Allylcresol

In a manner analogous to Example 1d, a resin was prepared from 40 grams of DCPD-Allylcresol from 3b, 160 grams of 4,4'-bismaleimidodiphenylmethane, 0.4 grams of 2,6-dimethylhydroquinone and 0.2 grams of triphenylphosphine. The softening point of the resin was 65° C., its gel time was 63 minutes at 160° C and the glass transition temperature of the cured polymer was above 300° C.

Example 4

(a) Preparing an Alkynyl-Group-Containing Polyphenol

A mixture of 300 grams of polyphenol prepared according to Example 1a and 77 grams of sodium hydroxide in 1000 ml of n-propanol was reacted with 181 grams of propargyl chloride in a manner analogous to that of Example 1b. Obtained was 311 grams of an oily product, which contains about 80 percent of DCPD-phenolpropargylether and about 20 percent of DCPD-propargylphenol. $^1$H-NMR (270 MHz, D$_6$-DMSO): 0.8–2.20 (m), 2.82 (m), 3.55 (m, CH$_2$-Propargyl-Aryl), 4.70–4.85 (m, CH$_2$-Propargylether), 6.70–7.35 (m).

(b) Preparing a Bismaleimide resin from the DCPD-Propargyl-Phenol-Ether.

A resin was prepared in a manner analogous to that of Example 1d from 30 grams of DCPD-Propargylphenol from Example 4a, 70 grams of 4,4'-bismaleimidodiphenylmethane, 0.2 grams of 2,6-dimethylhydroquinone and 0.1 grams of triphenylphosphine. The softening point of the resin was 40° C., the glass transition temperature of the cured polymer was in excess of 300° C and the water absorption was 3.55 percent.

Example 5

(a) Preparing a Propenyl-Group-Containing Polyphenol

A mixture of 200 grams of polyphenol prepared according to Example 1a, 73 grams of potassium hydroxide and 150 grams of methanol were heated for 12 hours at 110° C. After cooling, the mixture was neutralized with concentrated HCL and extracted with dichloromethane. After drying over anhydrous sodium sulfate and evaporation in a vacuum, 186 grams of a DCPD-propenylphenol having a softening point of 49° C was obtained.

(b) Preparing a Bismaleimide Resin from DCPD-Propenyl-Phenol

A resin was prepared in a manner analogous to Example 1d from 40 grams of the DCPD-Propenylphenol according to Example 5a, 160 grams of 4,4'-bismaleimidodiphenylmethane, and 0.4 grams of 2,6-dimethylhydroquinone. The softening point of the resin was 58° C and the glass transition temperature of the cured polymer was in excess of 300° C.

The embodiments of the invention in which an exclusive privilege or property is claimed are defined as follows.

1. A heat-curable resin system, comprising
   (a) a bismaleimide, and
   (b) a comonomer having the structural formula

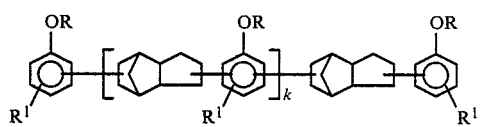

wherein the aryl rings

may be optionally substituted by $C_1$-$C_6$ alkyl, alkoxy, aryl, halogen, or nitro groups; wherein the mean value of k is greater than 0, and wherein for each aryl ring,
   (i) R is an alkenyl or alkynyl radical having from 3–6 carbon atoms; and $R^1$ is H; or
   (ii) $R^1$ is an alkenyl or alkynyl radical having from 3–6 carbon atoms and R is H.

2. The resin system of claim 1 wherein R and $R^1$ are selected from the group consisting of allyl, methallyl, propenyl, propargyl, and hydrogen radicals.

3. The resin system of claim 1 wherein k has a value between about 0.1 and 3.0.

4. The resin system of claim 2 wherein k has a value between about 0.1 and 3.0.

5. A fiber reinforced prepreg, comprising
   (a) at least one ply of reinforcing fibers selected from the group consisting of glass, carbon/graphite, aramid, and polyarylene fibers containing interspersed ether, ketone, —C($R^2$)$_2$—, or sulfone groups, wherein $R^2$ is $C_1$–$C_6$ lower alkyl, aryl, or cycloalkyl; and
   (b) the heat-curable resin system of claim 1.

6. A fiber reinforced prepreg, comprising
   (a) at least one ply of reinforcing fibers selected from the group consisting of glass, carbon/graphite, aramid, and polyarylene fibers containing interspersed ether, ketone, —C($R^2$)$_2$, and sulfone groups, wherein $R^2$ is $C_1$–$C_6$ lower alkyl, aryl, or cycloalkyl; and
   (b) the heat-curable resin system of claim 4.

7. A heat-curable bismaleimide resin system, comprising:
   (a) a bismaleimide resin; and
   (b) a comonomer prepared by the process of (i) phenolating dicyclopentadiene with a monophenol in the presence of a Friedel-Crafts catalyst;
(ii) reacting the product of (i) with an alkenyl or alkynyl halide containing from 3–6 carbon atoms; and optionally
(iii) rearranging the product of (ii) either in whole or in part through a Claissen rearrangement; and optionally
(iv) isomerizing all or part of any 2-alkenylarenes present to 1-alkenyl-arenes.

8. The resin system of claim 7 wherein said alkenyl or alkynyl halide is selected from the group consisting of the allyl, methallyl, propenyl, and propargyl chlorides and bromides.

9. A fiber reinforced prepreg, comprising
(a) at least one ply of reinforcing fibers selected from the group consisting of glass, carbon/graphite, aramide, and polyarylene fibers containing interspersed ether, ketone, $-C(R^2)_2$, and sulfone groups, wherein $R^2$ is $C_1$–$C_6$ lower alkyl, aryl, or cycloalkyl; and
(b) the heat-curable resin system of claim 8.

* * * * *